UNITED STATES PATENT OFFICE.

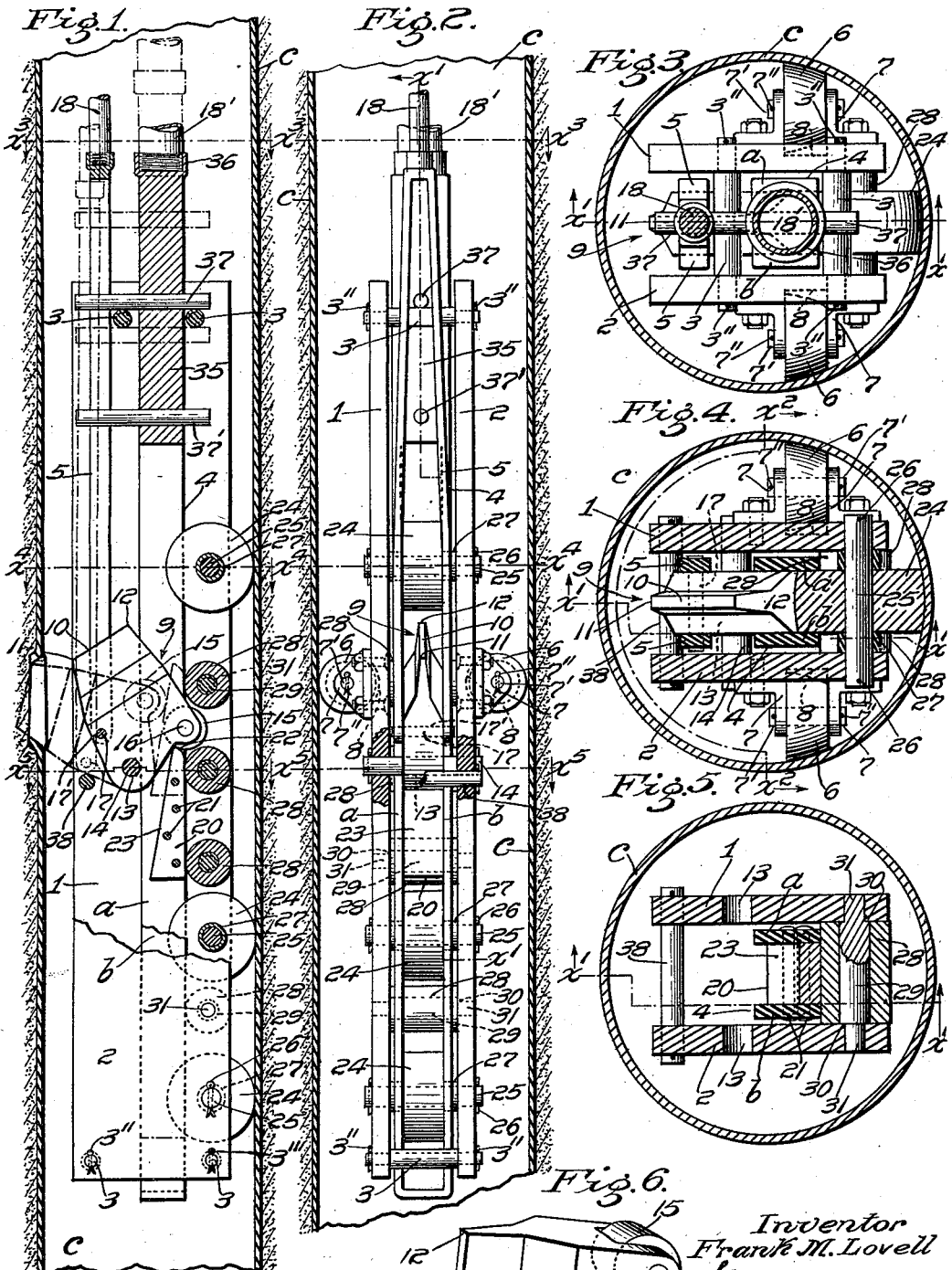

FRANK M. LOVELL, OF DOWNEY, CALIFORNIA.

WELL-CASING SLITTER AND PERFORATOR.

1,001,205. Specification of Letters Patent. Patented Aug. 22, 1911.

Application filed October 1, 1910. Serial No. 584,931.

*To all whom it may concern:*

Be it known that I, FRANK M. LOVELL, a citizen of the United States, residing at Downey, in the county of Los Angeles and State of California, have invented a new and useful Well-Casing Slitter and Perforator, of which the following is a specification.

An object of this invention is to provide a superior appliance by which a well-casing may be slit and perforated in the most effective manner for admitting oil or water from the earth strata into the casing; provision being made whereby the slits may be produced in groups arranged in horizontal bands around the casing at regular intervals.

An object of this invention is to make provision whereby the cutting blade may be forced through the well-casing with minimum power to make an opening of maximum size with minimum weakening effect upon the casing.

An object of this invention is to provide a casing perforator which will operate with a short up-and-down stroke to perforate the casing and withdraw the cutter from the perforation and which is capable of practically automatic action when connected with the walking beam of a drilling rig, to cut a circle of perforations in well-casing, the only manipulation required being that to turn the tool after each down stroke.

Other objects and advantages may appear from the subjoined detail description.

The accompanying drawings illustrate the invention.

Figure 1 is a side elevation partly in section on irregular line $x^1$ appropriately indicated in Figs. 2, 3, 4 and 5 showing a casing slitter and perforator constructed in accordance with this invention and applied inside a well casing, a fragment of which is shown in axial section. Fragments of the operating lines are also shown. Dotted lines indicate the position of parts at the close of the cutting stroke. Fig. 2 is an elevation of the appliance viewed from the left side of Fig. 1 and from line $x^2$, Fig. 4. Fragments of the side pieces are broken to show ends of the blade fulcrum and stop pin. Fig. 3 is a plan of the appliance viewed from line $x^3$, Figs. 1 and 2. Fig. 4 is a plan section on line $x^4$, Figs. 1 and 2. Fig. 5 is a plan section on line $x^5$, Figs. 1 and 2. Fig. 6 is a perspective view of the cutting blade detached with the blade roller in place.

Arrows on the several lines of section indicate the direction of sight.

The side members 1 and 2 are strong flat metal plates fastened together by shouldered pins 3 and cotter pins 3'' to form a body that may move freely down and up in the casing $c$, and provided with holes for various journals.

The side plates are spaced apart to provide ways for the main and trip reins 4 and 5, respectively, by which the appliance is carried and controlled. Side rollers 6 are mounted on the side plates 1 and 2 by means of journal-box members 7, axles 7' and cotter pins 7'' to roll along the inside of the casing so as to hold the perforator centrally in the casing; and the rims of said rollers are preferably beveled transversely to conform to the inside of the casing and are let into grooves 8 in the side plates 1 and 2. Different size rollers may be applied for different diameters of casing.

The cutting blade 9 is in the nature of a cam and is provided with a wedge-like cutting edge 10 extended in a right line across the blade and terminating in lower and upper pointed corners 11, 12. The main body of the blade is of such thickness as may be desired for the greatest width of any perforation or slit to be made in the casing and the blade widens and thickens slightly from the cutting edge 10 for a distance corresponding to the full cutting stroke of the blade and then rapidly increases in thickness to extend across the spaces between the side members, and is provided at the lower corner of its heel with a hole 13 through which extends the fulcrum pin 14 the ends of which are carried by the side plates. Said heel is provided at its upper corner with a thrust roller 15 mounted on a pin 16.

The trip rein 5 is connected with the slitting and perforating blade 9 by means of a pivot 17 in holes 17' between the fulcrum pin 14 and the lower corner of the cutting edge 10 of the blade. The reins are adapted at their upper ends for connection with operating lines which may be pipes 18, 18' that extend to the top of the well and are there connected with rig lines, not shown, which are operated by the derrick engine, not shown.

The main rein 4 is provided with a wedge-block 20 fastened thereto by rivets 21 and having a tip 22 and inclined face 23 for operative contact with the thrust roller 15 of the blade. The inclined face 23 slants inward downwardly, and when the blade is supported by the trip rein while the main rein is lowered the thrust roller 15 will rest upon the tip 22 of the wedge 20, and then by raising the main rein while the trip rein is released the wedge 20 as it is moved upward by the main rein 4 will force the thrust roller 15 upward toward the side of the appliance at which the edge 10 is located, thereby tilting the blade on its fulcrum 14 and forcing it into cutting position.

The casing rollers 24 are arranged to project beyond the perforator body on the side opposite that from which the blade projects to hold the body free from contact with the well-casing and to resist the thrust of the blade 9 in the operation of perforating the casing.

The casing rollers 24 are bored to receive journal pins 25 that are of uniform diameter and extend through holes in the side plates and are fastened by cotter pins 26 at their opposite ends, there being spacers 27 on the pins 25 between the rollers 24 and the side plates 1 and 2 to hold the rollers in true position.

The casing rollers are spaced apart along the body to accommodate between them the rein anti-friction rollers 28, each of which is centrally bored to receive pins 29 which are reduced at their ends to form shoulders 30 to engage the side plates 1 and 2 when the reduced ends 31 of the pins are inserted in holes therefor in the side plates. The main rein contacts with the anti-friction rein rollers 28 which are arranged in vertical lines.

The casing rollers 24 are of considerably greater diameter than the anti-friction rein rollers 28 and are detachable so that any desired diameter of casing roller may be used, thus to fit the appliance to casings of different diameters.

The main rein 4 may be made of a single piece of steel bent to embrace the wedge block 20 and casing rollers 24 between the limbs a, b; the bend being at the lower end of the rein and the upper ends of the rein limb being welded together to form a stem 35 provided with a collar 36 for connection with the part by which the rein is to be handled.

To limit the vertical movement of the main rein 4 relative to the side plates, two stop pins 37, 37' are fixed to and extend through the upper end 35 of the main rein to alternately engage the top shouldered pins 3 which act as main rein stops.

When the blade is to be retracted from cutting position the appliance is supported by the trip rein and the blade.

The roller 15 extends into the space between a pair of the rein rollers 28 and rests on the tip of the wedge when the blade is retracted so that the body of the appliance including the side plates will be carried by the blade when the trip rein is up and the main rein down. The casing rollers 24 are of less thickness than the space between the limbs a, b, of the main rein which contact the rein rollers 28. The blade roller 15 is somewhat shorter than the casing rollers 24 and plays freely between the limbs of the main rein.

A blade stop-pin 38 extends through the side plates 1 and 2 directly under the blade 9 to stop the blade at the close of the cutting stroke.

It is thus seen that the cutting blade 9 is pivoted at its lower corner by the fulcrum pin 14 and that its cutting edge 10 is at one side of a vertical drawn from said fulcrum pin; that the trip rein is pivoted to the cutting blade between said vertical and the cutting edge of said blade; that the main rein is provided with wedging means to contact with the blade through the medium of the roller 15 on the other side of said vertical; and that when the trip rein is held at the dotted position in Fig. 1 the main rein may be operated by vertical reciprocation such as may be produced by connecting the main rein with the walking beam, not shown, of a standard well rig.

In practical use the appliance will be lowered into the casing by means of the reins 4 and 5, the trip rein 5 being held in such position relative to the main rein 4 that the blade will be retracted as shown in solid lines in Fig. 1. When the blade has been brought to the level at which the lowest perforations are to be made, the main rein will be drawn up, at the same time the trip rein will be carried down a short distance, which movement is allowed by the spring or slack of the rig line, not shown, and thereupon the top of the wedge-block 20 will force the thrust roller 15 upward thereby tilting the blade 9 to bring its lower edge corner 11 into contact with and to thrust it through the casing; and as the wedge block 20 moves upward the blade is turned on the fulcrum pin 14, in the meantime being gradually tilted until the edge 10 is brought into nearly vertical position and is thrust through the casing a desired distance, preferably until the main body of the blade enters the casing. During this operation the thrust upon the main rein is sustained by the rein rollers 28, the side plates 1 and 2, and the casing rollers 24 and side rollers 6 which are in contact with the casing. Then without changing the vertical position of the trip rein the main rein will be lowered, thus withdrawing the wedge block from the thrust roller 15. When the perforation has been completed the main rein will be lowered, thus again bringing the weight of the body upon the trip rein thus tilting the blade out of the cut in the casing wall and returning the parts to the position shown in Fig. 1. Thereupon the appliance may be turned part way around and the operation just described will be repeated and so on until a circle or band of perforations has been completed around the casing. Then the whole appliance will be raised to bring the blade to the level for the next circle or band of perforations, whereupon the work as previously described will be repeated. By thus perforating a circle of holes at the lowest level by short vertical reciprocations of the main rein and then pulling up to a higher level and cutting another circle of holes in like manner the tool is kept out of the way of any sands that may flow into the casing and the necessity of withdrawing the perforator and using the sand pump is obviated.

If at any time the blade becomes stuck in the cut made in the casing, the main rein may be raised and suddenly dropped to cause the momentum of the body acting through the stops, to jar the blade loose.

Thus it is seen that this perforator is provided with combined wedge and lever means to force the blade through the casing and also with jars, so-called, to jar the blade loose.

To change the perforator to fit casing of a different diameter, the cotter pins in the ends of the casing-roller pins will be removed and the roller pins driven out, thus to release the casing rollers which may then be replaced with casing rollers, not shown, of an appropriate diameter. In like manner there will be substituted for the side rollers other side rollers, not shown, which are of such diameter as to fit the perforator to the casing to be perforated.

By removing the cotter pins from the shoulder pins and the journal pins a side plate and all the interior parts may be removed.

Particular attention is directed to the cam-like form and arrangement of the cutter blade and the manner in which the wedging force is applied to effect the operation of splitting the casing. By pivoting the blade at the lower portion of its heel to the body and providing it with an edge adapted to be drawn into and extended from the body, and having means at the upper portion of the heel of the blade with which the wedge moving relative to the body contacts, the power is applied in a more effective manner to force the blade with a cam-like action through the well-casing. Furthermore, by entirely retracting the blade into the body when the same is not making a cut, the tool may be raised and lowered without any liability of any perforation being made accidentally.

I claim:—

1. In a casing perforator having a body, a blade pivoted thereto and means to retract and support the blade, a main rein, and means on the main rein to force the blade into cutting position and stop means between the main rein and the body to support the body and to constitute means whereby the main rein and body may be made to act as jars to loosen the blade from its cut in the casing.

2. A casing perforator provided with a body, rollers of one diameter, rein rollers of a smaller diameter, said rollers being carried by the body and the rollers of larger diameter being adapted to contact with the casing, a blade pivoted to the body and provided with a roller, a main rein contacting the rollers of less diameter provided with means to contact the blade roller to move the blade in one direction and means to move the blade in the other direction.

3. A casing perforator having a body, a blade pivoted to the body, rein rollers carried by the body, a rein comprising two limbs between which the blade extends, said limbs contacting said rein rollers, a wedge carried by the main rein between its limbs to move the blade in one direction and means to move the blade in the other direction.

4. A casing perforator comprising a body, a blade pivoted at its lower edge to the body and provided with a cutting edge on one side of a vertical drawn from the pivot pin, a rein pivoted to the blade between the cutting edge and said pin and a main rein provided with means to act upon the blade on the other side of said pivot pin to force the cutting edge outward from the body.

In testimony whereof, I have hereunto set my hand at Los Angeles, California, this 20th day of September 1910.

FRANK M. LOVELL.

In presence of—
 JAMES R. TOWNSEND,
 OLIVE DIFFENDERFER.

Copies of this patent may be obtained for five cents each, by addressing the "Commissioner of Patents, Washington, D. C."